Aug. 11, 1936.                C. WEIDAUER                2,050,870
                              PINKING SHEARS
                           Filed Dec. 6, 1934
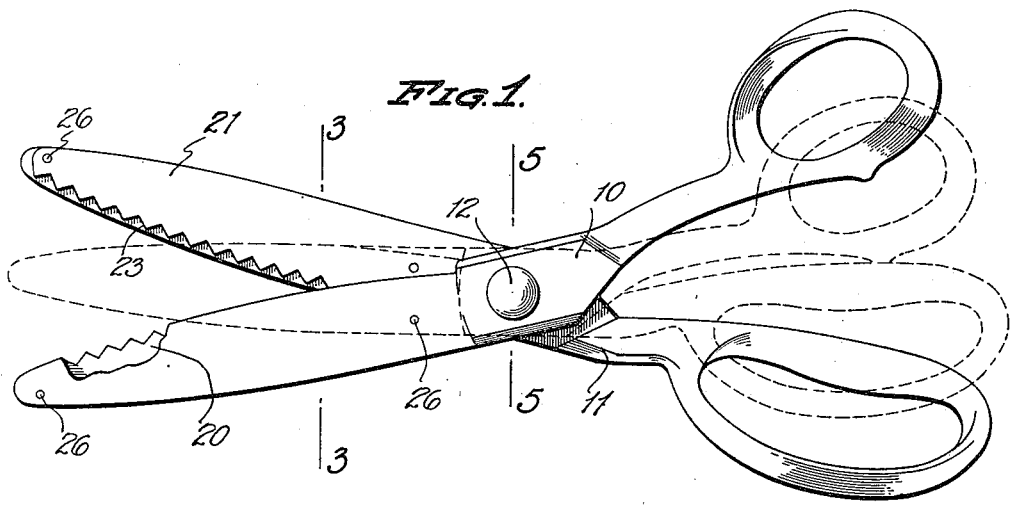
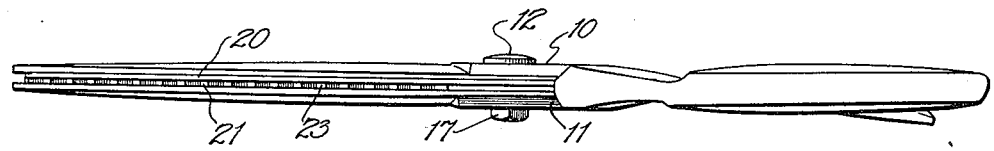
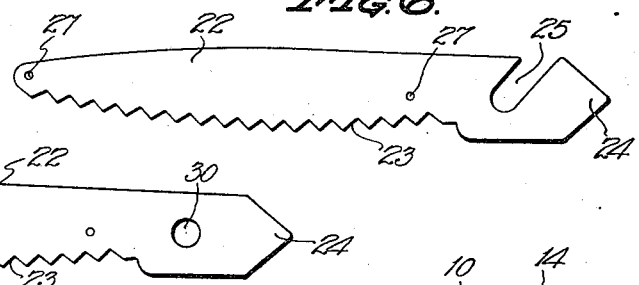
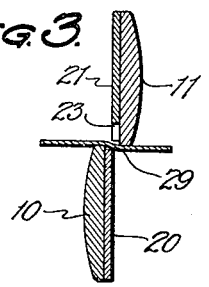
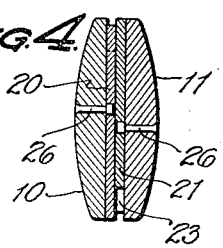
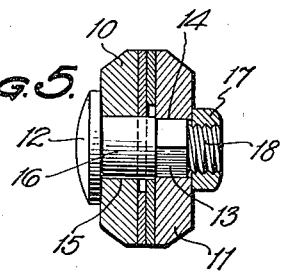
WITNESS:
INVENTOR.
CURTIS WEIDAUER.
BY
Ely Pattison.
ATTORNEYS.

Patented Aug. 11, 1936

2,050,870

UNITED STATES PATENT OFFICE 2,050,870

PINKING SHEARS

Curtis Weidauer, New York, N. Y., assignor to Samuel Briskman, New York, N. Y.

Application December 6, 1934, Serial No. 756,241

3 Claims. (Cl. 164—81)

This invention relates to new and useful improvements in shears and it pertains more particularly to pinking shears of the general type disclosed in prior Patent No. 1,965,443 granted to Wyner & Schulz July 3, 1934.

It is an object of the present invention to provide a new and improved form of pinking shears in which there is a new and improved type of removable blade.

In the patent above mentioned the cutting blades are shown as removable, and it is an object of this invention to provide a new and improved means for attaching removable cutting blades to the jaws of the shears.

Other objects of the invention will appear as the nature of the invention is better understood, for which purpose reference is had to the accompanying drawing.

In the drawing,

Figure 1 is a view in elevation showing a pair of shears constructed in accordance with the present invention, the shears being shown in open position in full lines and in closed position in broken lines, Figure 2 is a plan edge view of the shears, Figure 3 is a transverse sectional view illustrating the manner in which the blades operate to cut a piece of material and taken substantially on the line 3—3 of Figure 1, Figure 4 is a transverse sectional view showing the jaws closed, Figure 5 is a transverse sectional view taken substantially on the line 5—5 of Figure 1, Figure 6 is a plan view of one type of cutting blade, and;

Figure 7 is a plan view of a modified type of cutting blade.

Referring more particularly to the drawing, a pair of shears constructed in accordance with the present invention consists of two pivoted jaws 10 and 11. The jaws are pivotally connected together by means of a pivot bolt 12 which, as illustrated in Figure 5, has a squared portion 13. The squared portion 13 is designed to be received in a squared recess 14 in the jaw 11, the recess or opening 15 in the jaw 10 being circular in form and conforming in shape to the portion 16 of the pivot bolt 12. A nut 17 threaded on the portion 18 of the pivot bolt 12 is employed to secure the jaws in operating position.

Each jaw carries a cutting blade and these blades are designated 20 and 21, respectively. In Figure 6 I have shown one form of cutting blade and in this form the cutting blade comprises a main body portion 22 having a serrated edge 23 and a squared or angular rear end 24. Adjacent the rear end the blade is cut away as at 25 to receive the pivot pin 12. Means is also provided to prevent relative movement between the cutting blade and the jaw upon which it is mounted, and as best illustrated in Figure 4 this means consists of pins 26 carried by the jaws and projecting into openings 27 in the cutting blades.

In assembling the device the cutting blades are placed upon their respective jaws with the cut out portion 25 in alignment with the opening which receives the pivot pin 12 and with the pins 26 engaged in the openings 27. The two jaws may now be placed together and the nut 17 threaded upon the pivot pin 12. In positioning the cutting blades upon the jaws, they are so arranged that the serrated edges of the cutting blades will coincide with each other to provide a cutting edge which will produce in the article cut thereby a zigzag line commonly known in the trade as a "pinked edge".

The manner in which this cutting operation is carried out is disclosed in Figure 3 of the drawing, and it will be noted by reference to said figure that as the jaws and cutting blades are brought together, each jaw will tend to guide or direct the material being operated upon into engagement with the serrated cutting edge 23 of the cutting blade carried by the opposite jaw. This is shown in Figure 3 in which, as the jaws come together the jaw 11 tends to move the material into engagement with the serrated edge of the cutting blade 20, the jaw 10 serving likewise to move the material into engagement with the serrated edge 23 of the cutting blade 21. As the cutting blades come together the distortion of the material being operated upon which is illustrated by the curve therein designated 29 in Figure 3, will hold the material against movement relative to the jaws and cutting blades and insure the clean cutting of a serrated or pinked edge.

In Figure 7 I have illustrated a slightly modified form of the cutting blade. In this figure the cutting blade, which is substantially the same as that described heretofore, has merely a circular opening 30 for the reception of the pivot pin 12 as distinguished from the elongated slot 25 shown in Figure 6.

From the foregoing it will be apparent that the present invention provides a new and improved type of pinking shears in which the manufacture of such articles is materially reduced, which shears are simple and effective in operation and in which new cutting blades may be readily substituted for old or damaged cutting blades without necessitating the return of the scissors to the factory and without the requirement of special knowledge on the part of a person applying the substitute blades.

While the invention has been illustrated in its preferred forms it is obvious that it may be carried out in other forms within the scope of the appended claims and without departing from the spirit thereof.

Having thus described the invention, what is claimed as new, is:

1. A pinking shears comprising a pair of pivotally connected jaws having co-acting edges, a cutting blade carried by each of said jaws on the inner face thereof, each of said cutting blades having a serrated edge, said cutting blades and jaws being so constructed and arranged that each jaw operates to direct the material operated upon to the cutting blade of the other jaw.

2. A pinking shears comprising in combination, a pair of jaws having edges cooperating to hold the material to be cut, means for pivotally connecting said jaws together, and a separate cutting blade carried by each of said jaws, said cutting blades each conforming to the shape of its respective jaw, and a serrated cutting edge on each of said cutting blades, the cutting blades being positioned on their respective jaw with their serrated edges adjacent the cooperating edges of the jaws.

3. A pinking shears comprising in combination, a pair of jaws, means for pivotally connecting said jaws together, and a separate cutting blade carried by each of said jaws, said cutting blades each conforming to the shape of its respective jaw, and a serrated cutting edge on each of said cutting blades, the cutting blades each being positioned on its respective jaw with their serrated edges adjacent the cooperating edges of the jaws with the apices of the projections which form the serrations within the confines of the jaws.

CURTIS WEIDAUER.